United States Patent [19]

Kageyama et al.

[11] Patent Number: 5,039,504

[45] Date of Patent: * Aug. 13, 1991

[54] PROCESS FOR PRODUCING GRAPHITE WHISKERS

[75] Inventors: Yoshiteru Kageyama; Yoshiaki Sawada, both of Yokkaichi, Japan

[73] Assignee: Mitsubishi Petrochemical Company Limited, Tokyo, Japan

[*] Notice: The portion of the term of this patent subsequent to Feb. 28, 2006 has been disclaimed.

[21] Appl. No.: 455,964

[22] Filed: Dec. 20, 1989

[30] Foreign Application Priority Data

Dec. 21, 1988 [JP] Japan ................................. 63-322431

[51] Int. Cl.$^5$ ............................................. C01B 31/04
[52] U.S. Cl. ................................ 423/448; 423/447.3; 423/458; 75/362
[58] Field of Search ..................... 423/447.3, 448, 458; 75/362

[56] References Cited

U.S. PATENT DOCUMENTS

| | | | |
|---|---|---|---|
| 4,391,787 | 7/1983 | Tibbetts | 423/447.3 |
| 4,497,788 | 2/1985 | Bradley et al. | 423/447.3 |
| 4,565,684 | 1/1986 | Tibbetts et al. | 423/458 |
| 4,572,813 | 2/1986 | Arakawa | 423/447.3 |
| 4,650,657 | 3/1987 | Brooks | 423/447.3 |
| 4,652,305 | 3/1987 | Eberhoech et al. | 75/0.5 BA |
| 4,749,557 | 6/1988 | Yetter et al. | 423/447.3 |
| 4,767,737 | 8/1988 | Brooks | 423/447.3 |
| 4,808,216 | 2/1989 | Kageyama et al. | 75/0.5 A |

FOREIGN PATENT DOCUMENTS

| | | | |
|---|---|---|---|
| 58-110493 | 7/1983 | Japan | 423/448 |
| 59-43120 | 3/1984 | Japan | 423/447.3 |
| 61-266618 | 11/1986 | Japan | 423/447.3 |
| 1-40621 | 2/1989 | Japan | 423/447.3 |

*Primary Examiner*—Robert Kunemund
*Attorney, Agent, or Firm*—Koda and Androlia

[57] ABSTRACT

There is provided a process for producing graphite whiskers by supplying a carbon source compound with a carrier gas into a heating zone in a reactor and decomposing the carbon source compound in a gas phase in the presence of a catalyst, characterized in that the catalyst comprises ultrafine particles of a transition metal which have been obtained by the gas-phase thermal decomposition of a carbonyl compound of a transition metal in the presence of at least one organic compound containing oxygen and/or sulfur.

9 Claims, 1 Drawing Sheet

FIG. 1

PROCESS FOR PRODUCING GRAPHITE WHISKERS

BACKGROUND OF THE INVENTION

This invention relates to a process for producing carbon fibers (graphite whiskers) More specifically, this invention relates to a process for producing graphite whiskers by the gas-phase thermal decomposition of a carbon source compound using as a catalyst ultrafine particles of a transition metal prepared in a specific manner.

As reported in "New Developments in Applied Carbon Techniques", CMC, page 13, Morimichi Endo, and "Catalytic Growth of Carbon Filaments", R.T.K. Baker, Carbon, Vol. 27, No. 3, 315 (1980), for instance, the gas-phase process for the production of graphite whiskers generally comprises supplying a gas of a carbon source compound together with ultrafine transition metal particles as a catalyst having a particle size of 0.5 to 0.001 μm into a heating zone and decomposing the carbon source compound to produce carbon fibers in the form of whiskers.

Specific examples of such a process are disclosed in Japanese Patent Kokai (Laid-Open) Publication No. 52-103528, Japanese Patent Publication No. 53-7538, Japanese Patent Kokai Publication No. 57-117622, Japanese Patent Kokai Publication No. 61-136992 (EP-A 184317, U.S. Pat. No. 4663230) and so on. Japanese Patent Kokai Publication No. 61-136992, for instance, proposes a gas-phase process for producing carbon fibers using as a catalyst ultrafine iron particles which have been obtained by feeding a gas of $Fe(CO)_5$ into a reactor and decomposing the same.

Carbon fibers produced by these gas-phase processes are characterized by their higher crystallinity (graphitic nature) and taking a more whiskery morphology in comparison with carbon fibers usually based on PAN and pitch, and are thus expected to be applied to highly rigid structural materials, high-performance materials and so on, to which conventional carbon fibers have not yet been applied.

The properties of the carbon fibers produced by the gas-phase methods, e.g., their physicochemical properties such as crystallinity and rigidity as well as their morphological properties such as whiskers' length and thickness depend upon the reaction conditions, types of carbon sources and other factors. In particular, the length and thickness of whiskers correlate with, inter alia, the size and shape and these distribution of the catalyst particles used and so depend largely thereon.

In order to produce graphite whiskers of uniform length and thickness and having a sharp particle size distribution, it is required to use a catalyst of uniform particle size and shape as well as a sharp particle size distribution.

So far as the present inventors know, however, graphite whiskers obtained with the use of such a catalyst as disclosed in the above described prior art are so uneven in their length and thickness and so broad in their particle size distribution that there are problems with such graphite whiskers in their applications as described above. There is therefore left much to be desired in this respect.

SUMMARY OF THE INVENTION

In view of the state of the art as mentioned above, the present inventors have made intensive and extensive studies of an improved gas-phase process for producing graphite whiskers, and finally accomplished the present invention.

Thus, the present invention provides a process for producing graphite whiskers by supplying a carbon source compound with a carrier gas into a heating zone in a reactor and decomposing the carbon source compound in a gas phase in the presence of a catalyst, characterized in that the catalyst comprises ultrafine particles of a transition metal which have been obtained by the gas-phase thermal decomposition of a carbonyl compound of a transition metal in the presence of at least one organic compound containing oxygen and/or sulfur.

According to the gas-phase process of the present invention, the resulting graphite whiskers have uniform length and thickness and have a sharp particle size distribution.

Accordingly, the graphite whiskers produced by the process of the present invention are advantageously used, for example, as fillers in high-performance composite materials, for various functional materials in electronic material fields, etc.

DETAILED DESCRIPTION OF THE INVENTION

Transition Metal Ultrafine Particles

Figure 1:
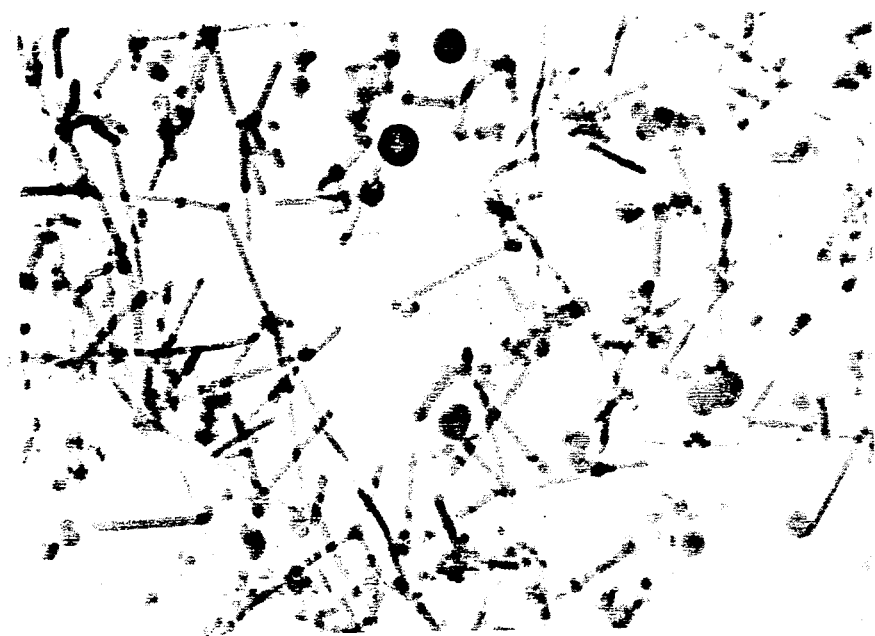
FIG. 1 is an electron micrograph showing the shape of the graphite whiskers obtained in Example 1.

The ultrafine particles of a transition metal used as a catalyst in the process of the present invention are obtained by the gas-phase thermal decomposition of a carbonyl compound of a transition metal in the presence of at least one compound containing oxygen and/or sulfur.

Specifically, a carbonyl compound of a transition metal and an organic compound containing oxygen and/or sulfur are supplied with a diluent gas such as an inert gas (e.g., argon, nitrogen, helium, hydrogen or carbon monoxide) into a heating zone in, for example, a flow-type reactor to carry out thermal decomposition. As a diluent gas, use may be made of any gas which can attain the object to be desired. Thus, other than the above exemplified gases or a mixed gas of these, use may be made of a mixed gas of these with other gases such as methane gas.

The carbonyl compounds of transition metals usable in the present invention are not critical provided that they are carbonyl complexes of transition metal elements such as Fe, Ni, Co, W and Cr. Preferable examples are $Fe(CO)_5$, $Fe(CO)_9$, $Ni(CO)_4$, $Co(NO)(CO)_3$, $Co_2(CO)_8$, $W(CO)_6$, $Mo(CO)_6$ and $Cr(CO)_6$ or mixtures thereof. Particular preference is given to $Fe(CO)_5$ and $Ni(CO)_4$ or their mixture.

The oxygen-containing organic compounds usable in the present invention may be any organic compound which contains at least one oxygen atom in the molecule. Specific examples are alcohols, esters, ketones and ethers. In order for such compounds to readily take a form of gas under thermal decomposition conditions, they should preferably have a relatively low molecular weight or a relatively small number of carbon atoms.

The alcohols (inclusive of silanols) to be used may be a saturated aliphatic alcohol (preferably having 1-10 carbon atoms), an alicyclic alcohol (preferably of a three-six membered ring having 4-10 carbon atoms) or an aromatic alcohol preferably having 6-10 carbon atoms). Use may be made of not only monovalent but also polyvalent alcohols. Specific examples are methyl alcohol, ethyl alcohol, propyl alcohol, butyl alcohol, octyl alcohol, trimethyl alcohol and ethylene glycol.

The esters are preferably those of such alcohols as mentioned above and monovalent or polyvalent, preferably monovalent or divalent, most preferably monovalent carboxylic acids. Specific examples of such esters are benzoates, ethyl acetate and butyl butyrate.

The ketones preferably have 3-10 carbon atoms and may include, for example, acetone, diethyl ketone, methyl ethyl ketone and methyl propyl ketone.

The ethers preferably have 2-10 carbon atoms and may include, for example, diethyl ether, tetrahydrofuran and dibutyl ether.

Among these oxygen-containing organic compounds, preference is given to alcohols in view of obtaining ultrafine metal particles of uniform particle size, as desired in the present invention, inter alia, to monovalent alcohols having about 1-8 carbon atoms.

The sulfur-containing organic compounds usable in the present invention may be any organic compound which contains at least one sulfur atom in the molecule, and may specifically include, for example, mercaptans and thioethers. In order for these compounds to readily take a form of gas under thermal decomposition conditions, they should preferably have a relatively low molecular weight or a relatively small number of carbon atoms.

The mercaptans preferably have 1-10 carbon atoms and may specifically include, for example, methanethiol, ethanethiol, n-propanethiol, n-butanethiol, n-pentanethiol and n-hexanethiol.

The thioethers preferably have 2-8 carbon atoms and may specifically include, for example, methylthiomethane, ethylthiomethane, butylthiomethane, propylthiomethane, ethylthioethane, propylthioethane and butylthioethane.

Among these sulfur-containing organic compounds, especially preferred are mercaptans having 1-6 carbon atoms.

In the present invention, both the oxygen-containing and sulfur-containing organic compounds may be used at the same time, provided that their total amount is in such a range as will be described later.

In the present invention, an organic compound containing in the moleodule an oxygen atom and a sulfur atom at the same time may also be used.

The amount of the transition metal carbonyl compound used should preferably be 3% by volume or less relative to the diluent gas such as an inert gas.

The amount of the organic compound containing oxygen and/or sulfur is in a range of, in molar ratio, preferably 0.0001 to 0.1, more preferably 0.001 to 0.05 relative to the transition metal carboxyl compound. At a molar ratio exceeding 0.1, oxides are formed in the reaction product, thus giving rise to a lowering of the catalytic activity. The molar ratio of less than 0.0001 will not produce the intended effect.

The thermal decomposition may be carried out at a temperature of 300° to 1000° C., preferably 400° to 700° C. for a residence time of 5 seconds or less, preferably 2 seconds or less, in a reaction system. A temperature higher than 1000° C. is unpreferred because the particle size distribution of the resulting metal particles becomes broader due to occurrence of the agglomerative growth of the metal particles. A temperature lower than 300° C. is again unpreferred because of the particle size becoming larger than desired.

The ultrafine transition metal particles obtained by such a method as described hereinabove are in the form of spherical particles having a particle size ranging from 0.001 $\mu$m to 0.5 $\mu$m and a very sharp particle size distribution. By properly selecting the reaction conditions, it is possible to obtain spherical particles having a particle size ranging from 0.05 $\mu$m to 0.1 $\mu$m and a yet sharper particle size distribution, which are more preferred for the catalyst according to the present invention.

The oxygen-containing and sulfur-containing organic compounds may be added to the reaction system in any suitable manner. However, it is preferred that prior to entering into the heating zone, they are previously mixed with a gas mixture of the transition metal carbonyl compound and the diluent gas such as an inert gas.

Production of Graphite Whiskers

The process for producing graphite whiskers according to the present invention is substantially similar to the known gas-phase processes as described in the aforesaid publications except that the catalyst obtained by the above described specific process is used and proper modifications of the reaction conditions may be made due to the use of such catalyst.

Thus, a carbon source compound diluted with a carrier gas is introduced into a reactor heated to a given temperature, in which it is brought in contact with the above catalyst so as to produce graphite whiskers.

As the carbon source compound, relatively low-boiling hydrocarbons such as carbon monoxide, methane, ethane, benzene and toluene are preferably used. As the carrier gases, use may be made of, e.g., hydrogen and/or an inert gas such as argon or nitrogen, but preference is given to hydrogen.

The catalyst may be added to the reaction system in any suitable manner that allows it to come in contact with the gas of the carbon source compound. In a preferred manner, the catalyst particles are dispersed over the surface of a substrate such as a reactor wall or they are supplied in the reactor while being suspended in the carrier gas.

The temperature of the reaction zone is in a range of 400° to 1200° C., preferably 500° to 1000° C.

According to the present invention, it is possible to produce graphite whiskers having a diameter and length controlled to the respective ranges of 0.2 to 2 $\mu$m and 5 to 100 $\mu$m by properly selecting the reaction conditions.

The examples that follows are given to illustrate some embodiments of the present invention without implying any limitation.

EXAMPLE 1

Preparation of Catalyst

Quartz wool was packed at a thickness of 1 cm in the middle of a reaction tube of 27 mm in inner diameter and 1 m in length. Then a gas mixture of 1.5% by volume of Fe(CO)$_5$ and 0.01% by volume of n-butyl alcohol, diluted with nitrogen, was introduced into the reaction tube, and gas-phase thermal decomposition reaction was carried out at a temperature of 450° C. for a residence time of 0.8 second, thereby depositing ultrafine iron catalyst particles on the quartz wool and on the tube wall.

The ultrafine iron particles thus obtained were in the form of ultrafine spherical particles having a mean particle size of 0.04 μm and having a sharp particle size distribution.

Preparation of Graphite Whiskers

A water gas (CO/H$_2$ molar ratio=1) as a carbon source and also as a carrier gas was passed through the reaction tube deposited with the above ultrafine iron catalyst particles at a gas flow rate of 0.5 m$^3$/hour and a reaction temperature of 600° C. for 10 minutes to carry out reaction for the formation of graphite whiskers.

The graphite whiskers thus obtained had a mean diameter of 0.2 μm, a mean length of 10 μm and a very sharp particle size distribution. FIG. 1 is an electron micrograph showing the shape of the obtained graphite whisker fibers at a 10,000×magnification.

COMPARATIVE EXAMPLE 1

Preparation of Catalyst

To prepare ultrafine iron catalyst particles, Example 1 was repeated except that no n-butyl alcohol was added.

The resulting ultrafine iron particles were so uneven in their particle size that it had a broad particle size distribution, although they had a mean diameter of as low as 0.06 μm.

Preparation of Graphite Whiskers

In the reaction tube deposited with the above ultrafine iron catalyst particles, reaction for the formation of graphite whiskers was carried out in the same manner as in Ex. 1.

Figure 2:
FIG. 2 is an electron micrograph showing the shape of the graphite whiskers obtained in Comparative Example 1.

The graphite whiskers thus formed were found to b badly uneven in their mean diameter and length. FIG. 2 is an electron micrograph showing the shape of the obtained graphite whiskers at a 10,000×magnification.

EXAMPLE 2

To prepare ultrafine iron catalyst particles, Example 1 was repeated except that 0.005% by volume of methanethiol was used in place of n-butyl alcohol, thereby depositing ultrafine iron particles on the quartz wool and on the wall of the reaction tube.

The ultrafine iron particles thus formed were in the form of ultrafine spherical particles having a mean diameter of 0.03 μm and a very sharp particle size distribution.

Graphite whiskers were prepared with the above catalyst in the same manner as in Ex. 1. The obtained graphite whiskers had a mean particle size of 0.15 μm, a mean length of 10 μm and a very sharp particle size distribution.

What is claimed is:

1. A process for producing graphite whiskers by supplying a carbon source compound with a carrier gas into a heating zone in a reactor and decomposing said carbon source compound in a gas phase in the presence of a catalyst, characterized in that the catalyst comprises ultrafine particles of a transition metal which have been obtained by the gas-phase thermal decomposition of a carbonyl compound of a transition metal in the presence of at least 0.0001 to 0.1 mol % with respect to said carbonyl compound of one organic compound containing oxygen and/or sulfur.

2. The process according to claim 1, wherein the organic compound containing oxygen and/or sulfur is selected from the group consisting of alcohols, esters, ketones, ethers, mercaptans, thioethers and mixtures thereof.

3. The process according to claim 1, wherein the amount of the organic compound containing oxygen and/or sulfur is 0.001 to 0.05 mol % with respect to the carbonyl compound of a transition metal.

4. The process according to claim 1, wherein the gas-phase thermal decomposition of said carbonyl compound is carried out at a temperature of 300° to 1000° C.

5. The process according to claim 1, wherein the gas-phase thermal decomposition of said carbonyl compound is carried out for a residence time of 5 seconds or less in a reaction system.

6. The process according to claim 1, wherein the ultrafine particle of a transition metal have a particle size of 0.001 to 0.5 μm.

7. The process according to claim 4, wherein said temperature is 400°–700° C.

8. The process according to claim 5, wherein said residence time is 2 seconds or less.

9. The process according to claim 6, wherein said particle size is 0.05 to 0.1 μm.

* * * * *